United States Patent
Sharma et al.

(10) Patent No.: US 11,176,196 B2
(45) Date of Patent: Nov. 16, 2021

(54) UNIFIED PIPELINE FOR MEDIA METADATA CONVERGENCE

(71) Applicant: Apple Inc., Cupertino, CA (US)

(72) Inventors: Ashish Sharma, Haymarket, VA (US); Han Jia, Seattle, WA (US); Jianqing Sun, Cupertino, CA (US); Philip Edward Lamond, London (GB); Darren Seeto, London (GB); Edward J. Roberts, Seattle, WA (US); Michael H. Walker, Seattle, WA (US); Christopher J. Powell, London (GB)

(73) Assignee: Apple Inc., Cupertino, CA (US)

( * ) Notice: Subject to any disclaimer, the term of this patent is extended or adjusted under 35 U.S.C. 154(b) by 215 days.

(21) Appl. No.: 16/273,648

(22) Filed: Feb. 12, 2019

(65) Prior Publication Data

US 2020/0104321 A1     Apr. 2, 2020

Related U.S. Application Data

(60) Provisional application No. 62/738,474, filed on Sep. 28, 2018.

(51) Int. Cl.
| | |
|---|---|
| *G06F 16/78* | (2019.01) |
| *G06F 16/21* | (2019.01) |
| *G06F 16/908* | (2019.01) |
| *G06F 16/16* | (2019.01) |

(52) U.S. Cl.
CPC .......... *G06F 16/78* (2019.01); *G06F 16/212* (2019.01); *G06F 16/908* (2019.01); *G06F 16/164* (2019.01)

(58) Field of Classification Search
None
See application file for complete search history.

(56) References Cited

U.S. PATENT DOCUMENTS

| | | | |
|---|---|---|---|
| 7,720,918 B1* | 5/2010 | Martin | G06Q 30/00 709/206 |
| 9,305,119 B1* | 4/2016 | Partovi | G06F 16/48 |
| 2007/0050467 A1* | 3/2007 | Borrett | G06Q 10/10 709/213 |
| 2007/0140525 A1* | 6/2007 | Kottomtharayil | G06Q 10/087 382/103 |
| 2009/0024650 A1* | 1/2009 | Kamani | G06F 16/90 |
| 2011/0289094 A1* | 11/2011 | Fisher | G06F 16/41 707/748 |

(Continued)

*Primary Examiner* — Uyen T Le
(74) *Attorney, Agent, or Firm* — Invoke

(57) ABSTRACT

In some implementations, a computing device may perform a method for providing a unified pipeline for media metadata to converge disparate schemas and data structures into a global unified graph. The method includes receiving media metadata from disparate media sources that may each have a different metadata schema that defines the structure and attributes of the metadata provided by each media source. The computing device may compare media metadata received from the different media sources to determine that metadata received from the different media sources correspond to similar, or the same, media entities (e.g., songs, movies, books, etc.). The metadata for the similar media entities may then be combined into a global unified graph that may include metadata attributes and/or values of the metadata received from the various media sources.

24 Claims, 7 Drawing Sheets

(56) References Cited

U.S. PATENT DOCUMENTS

| | | | | |
|---|---|---|---|---|
| 2015/0012949 A1* | 1/2015 | Kulick | ............ | H04N 21/47202 |
| | | | | 725/49 |
| 2015/0213129 A1* | 7/2015 | Pingree | ................... | G06F 16/83 |
| | | | | 707/769 |
| 2015/0339359 A1* | 11/2015 | Takaoka | ................ | G06F 16/211 |
| | | | | 707/602 |
| 2016/0055184 A1* | 2/2016 | Fokoue-Nkoutche | ....................... | |
| | | | | G06F 16/213 |
| | | | | 707/809 |
| 2018/0144067 A1* | 5/2018 | Chatelain | ............. | G06F 16/907 |

* cited by examiner

UNIFIED PIPELINE FOR MEDIA METADATA CONVERGENCE

TECHNICAL FIELD

The disclosure generally relates to managing media and metadata thereof, and more specifically, to providing a unified pipeline for managing different media metadata schemas and formats and converging those schemas into a global unified graph.

BACKGROUND

Various different types of media, such as music, movies, online videos, blogs, etc., are readily available from various media sources online via the Internet, accessible via one or more specific applications, websites, servers, or through other network sources. This media typically includes metadata that describes the type of media and characteristics of the media. The metadata associated with the media from the various media sources may be cross-related to other media and/or data sources to enhance the metadata available to describe the media. Moreover, certain aspects of some types of media may also be applicable to other media, even media of different types, like when a singer is also an actor.

Therefore, it is difficult to efficiently search and retrieve all available information for a particular media entity (e.g., actor, singer, song, album, movie, etc.) without searching all of the various media sources to determine what information is available that describes the searched-for media entity.

SUMMARY

In some implementations, a computing device may perform a method for providing a unified pipeline for media metadata to converge disparate schemas and data structures into a global unified graph. The method includes receiving media metadata from disparate media sources that may each have a different metadata schema that defines the structure and attributes of the metadata provided by each media source. The computing device may compare media metadata received from the different media sources to determine that metadata received from the different media sources correspond to similar, or the same, media entities (e.g., songs, movies, books, etc.). The metadata for the similar media entities may then be combined into a global unified graph that may include metadata attributes and/or values of the metadata received from the various media sources.

Particular implementations provide at least the following advantages. The global unified graph provides more efficient access to a wealth of media information available from various media sources from which the media information is collected, without requiring indexing and searching of different media sources when information is sought. In addition, a single unified representation of many duplicated entities may be created using the global unified graph, further refining media information retrieval.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
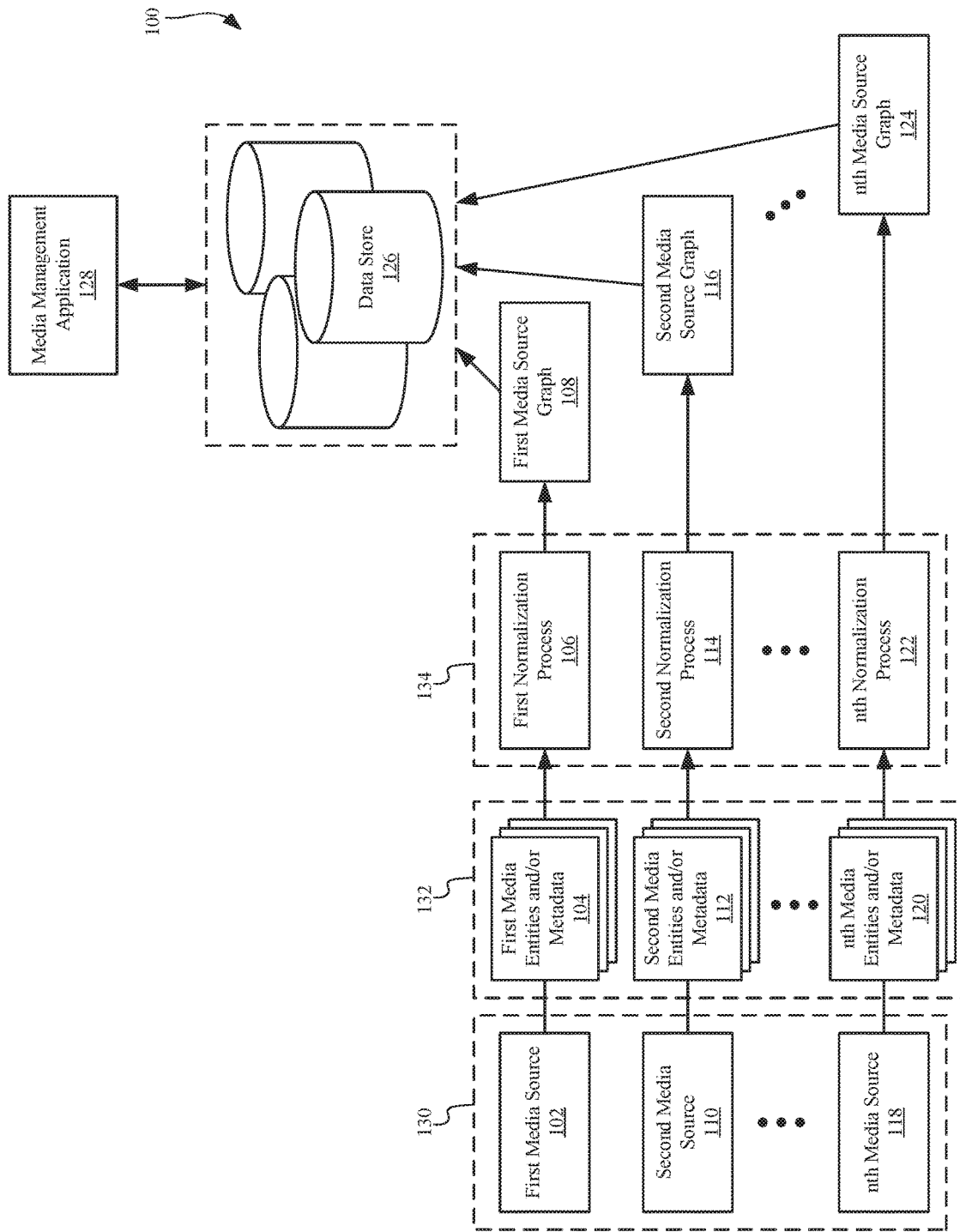
FIG. 1 is a block diagram of an example system for onboarding media and metadata from various media sources.

FIG. 1 is a block diagram of an example system 100 for implementing a unified pipeline for media metadata convergence. System 100 is configured to collect media information 132 from various media sources 130, and to store the collected media information to the data store 126 for access by the media management application 128. The media information 132 undergoes various normalization processes 134 to produce media source graph data prior to being stored to the data store 126. The media information 132 that the system 100 intakes may be externally formatted according to various metadata schemas (specific to each media source 130 individually), which are translated onto various media source graphs that describe the media information 132 available from a particular media source 130.

The various media source graphs all describe media entities and metadata according to a shared data structure. After creation of these various media source graphs, a global unified graph is created that describes all of the media entities, metadata, and relationships therebetween of the collected media information 132 based on the various media source graphs, as will be described in more detail with respect to FIGS. 2-5.

Referring again to FIG. 1, the data store 126 comprises one or more physical data storage devices, such as tape drive(s), hard disk drive(s), flash memory, random access memory, optical disc drive(s), non-volatile memory, etc. Data store 126 may include various databases that store media metadata that may be organized in a variety of different ways. In some approaches, certain media information may be stored to one particular memory of the data store 126 while other types of media information are stored to other memories of the data store 126.

As shown, first media entities and/or associated metadata 104 are obtained from a first media source 102, second media entities and/or associated metadata 112 are obtained from a second media source 110, . . . , and nth media entities and/or associated metadata 118 are obtained from an nth media source 120. There is no limit to the number of media sources 130 from which media entities and/or metadata may be obtained. Moreover, the media information 132 that is obtained (e.g., media entities, metadata about media entities, etc.) may vary depending on the individual media source 130 from which the media information 132 is obtained. For example, first media source 102 may provide media entities (e.g., songs, movies, videos, books, blogs, etc.) and media metadata (e.g., data describing attributes, aspects, and/or characteristics of media entities), while second media source 110 may provide media metadata but not media entities.

The various different media sources 130 each provide media entities, metadata about media entities, or media entities and associated metadata (collectively media information 132). In some instances, a particular media entity may have a plurality of specific metadata that describes the particular media entity, while the particular media entity may also constitute additional metadata about a different media entity. For example, a recording of a song may be a media entity that has metadata that include the singer, album on which the recording was published, release date, etc. However, the singer is also a media entity, and the recording of the song constitutes metadata about the singer when viewed as one of a plurality of songs that the singer was a contributor for. Therefore, depending on which context is being analyzed, media entities and metadata may be interchangeable concepts.

For the sake of clarity, for the remainder of the descriptions herein, a media entity comprises a fixed and reproducible expression of a visual and/or audible performance. Media entities may include any type of visual and/or audible performances known in the art, such as videos, video collections or libraries, movies, images, pictures, photos, plays, musicals, songs, collections of songs (albums), playlists, live recordings (such as audio and/or video recordings of speeches, educational lectures, demonstrations, sports, debates, stand-up comedy routines, political events, etc.), video clips, weblogs (e.g., blogs), podcasts, social media posts, etc. Of course, the type of media that may comprise a media entity is not limited by the descriptions included herein, and a media entity may include any media content, whether specifically described herein or not, that is known in the art.

Moreover, in the remaining descriptions herein, metadata comprises information that describes attributes, aspects, and/or characteristics of one or more media entities. Moreover, in some approaches, media entities may also constitute metadata when they are used to describe a different media entity. In an example of different types of media information, that may be metadata or media entities, a contributor is a person who has contributed to a work, song, video, movie, recording, or some other media entity; an agent is a person, group, or organization that works on behalf of a contributor; a work is an audible, musical, video, written, or other media composition; a recording is a recorded performance of a work; a track is a fixed release of a recording, such as on a single, an album, in a movie, posted online, etc.; a release is a product containing a collection of recordings; and a group includes related media entities, typically but not always of the same type.

Of course, for other types of media (e.g., movies versus music, blogs versus video clips, etc.), different media metadata may be of interest that further define and identify the specific media type. All of these different media entities and associated metadata may be consolidated together in the data store 126 using a global unified graph based on the various media source graphs.

Moreover, the various different media sources 130 may include media entities and/or metadata of varying types. Additionally, some media sources 130 may include media entities without metadata associated therewith, some media sources 130 may include metadata about media entities that are not included therewith, and some media sources 130 may include media entities with metadata associated therewith.

The metadata about any particular media entity may be available from a certain media source in addition to the particular media entity, or may be located and obtainable from a media source different from the certain media source from which the particular media entity is acquired.

In some approaches, the media information 132 may adhere to individual metadata schemas that define data structures for the metadata and media entities for each media source 130 individually.

For example, a first metadata schema that the first media source 102 uses may be different than a second metadata schema used by the second media source 110. Moreover, in one example, the first metadata schema may be incompatible with the second metadata schema, thereby making it difficult to understand what media information 132 is being provided by the first media source 102 and second media source 110, individually, without knowing the metadata schema used for each media source.

In another approach, the type of media information (media entities, metadata, or both) that is being provided by the various media sources 130 may vary depending on the individual media source 130. This further complicates attempts to unify the metadata schemas of the various media sources 130 used for the collected media information, given that not only the metadata schema that is used for each of the various media sources 130 may be different, but also the type of media information that is provided by each of the various media sources 130 may be different.

In one example, the first media source 102 may include musical recordings and metadata for each musical recording that describes the musical recording while the second media source 110 may include lyrics to popular musical recordings and album cover art. In this example, the musical recordings may include songs, collections of songs (albums), and live recordings of music and musical acts. In this example, the type of media information provided by the first media source 102 and the second media source 110 is different. Moreover, the metadata schema used by each of the first and second media sources 102, 110 may also be different, as how a song and album are stored and presented is different from how song lyrics and album cover art are stored and presented. In addition, the media information of both media sources 102, 110 is additive in that the media information (lyrics) of the second media source 110 compliments the media information (musical recordings) of the first media source 102. Therefore, the media entities 104 of the first media source 102 may be combined with the metadata 112 of the second media source 110 to describe the individual media entities 104 of the first media source 102 to provide more complete information about the songs and albums.

In another example, the first media source 102 may include songs and playlists while the second media source 110 may include artist pseudonyms. In this example, the type of media information provided by the first media source 102 and the second media source 110 is different. Moreover, the metadata schema used by each of the first and second media sources 102, 110 may also be different, as how a song and playlist are stored and presented is different from how artist pseudonyms are stored and presented. In addition, the media information of both media sources 102, 110 is additive in that the media information (names that certain artists are known by) of the second media source 110 compliments the media information (songs and playlists) of the first media source 102. Therefore, the media entities 104 of the first media source 102 may be combined with the metadata 112 of the second media source 110 to describe the individual media entities 104 of the first media source 102 to provide more complete information about the songs and playlists.

In another example, the first media source 102 may include videos and movies while the second media source 110 may include movie credits for actors and actresses. In this example, the type of media information provided by the first media source 102 and the second media source 110 is different. Moreover, the metadata schema used by each of the first and second media sources 102, 110 may also be different, as how videos and movies are stored and presented is different from how a database of actor and actress credits are stored and presented. In addition, the media information of both media sources 102, 110 is additive in that the media information (actor and actress movie credits) of the second media source 110 compliments the media information (videos and movies) of the first media source 102. Therefore, the media entities 104 of the first media source 102 may be combined with the metadata 112 of the second media source 110 to describe the individual media entities 104 of the first media source 102 to provide more complete information about the videos and movies.

Of course, media information 132 may be retrieved from multiple media sources 130 to provide as complete of a description for each media entity as is possible given the information available via the plurality of media sources 130.

The media management application 128 may be a centralized or distributed application, module, or routine that has access to the data store 126 where the collected source graph data (first media source graph 108, second media source graph 116, . . . , nth media source graph 124) is stored after the media information 132 undergoes the various normalization processes 134. The media management application 128 provides a user interface (UI) for accessing the collection of media information 132 obtained from the various media sources 130 for enhanced searching of the media information 132 of the various media sources 130 without needing to understand and utilize the various different metadata schemas for each of the various media sources 130.

In one example, the media management application 128 may also operate the various normalization processes 134 for intaking the media information 132 from the various media sources 130.

In another example, the various normalization processes 134 may be partially or entirely performed by some other system or systems external from the media management application 128, with the external system(s) providing the normalized information for creation of the several media source graphs.

Each of the various normalization processes 134 produce source graph information for each media source, e.g., the first normalization process 106 produces a first media source graph 108, the second normalization process 114 produces a second media source graph 116, . . . , the nth normalization process 122 produces an nth media source graph 124. Each of the various normalization processes 134 analyzes the media information 132 to determine what type of media entity is represented, and/or what information is included in the metadata along with which specific media entity is described by the metadata. Once these various graphs are produced, they are applied to media information 132 retrieved from each media source 130 individually for retrieving additional media information from the particular media sources for which media source graphs have been created. In other words, each media source graph streamlines the intake of media information for a particular media source. The media source graphs are stored to the data store 126 for use in further processing of media information.

In one example, rules for creating a media source graph for music information may include: 1) an artist with more than one pseudonym and/or role is identified as the same contributor; 2) a band is a group of contributors, with membership limited to a period of time in which the band produced music and recordings; 3) a work includes one or more recordings; 4) a track is a recording, having a designated position on an album, single, or compilation; 5) more than one release of an album having different release dates is an album group.

After the normalization processes 134 have been applied to the various media information 132 from the various media sources 130, the resultant normalized media information that is stored to the data store 126 utilizes a global unified graph of the media management application 128. Moreover, the global unified graph includes the capability to store more attributes and aspects as metadata than any single metadata schema for the various media sources 130.

Figure 2:
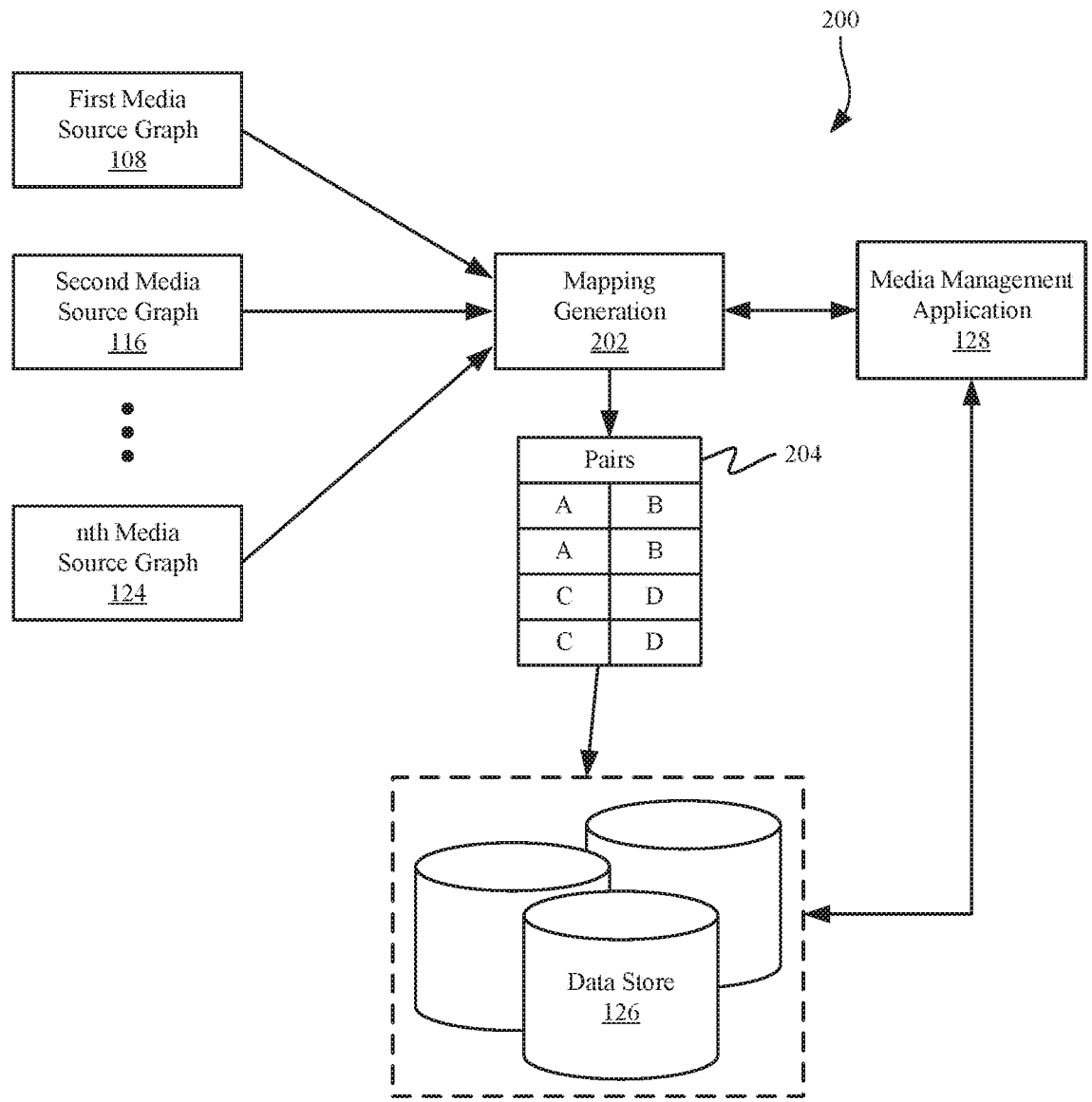
FIG. 2 is a block diagram of an example system for media data mapping.

Now referring to FIG. 2, a block diagram of an example system 200 for media data mapping is shown. The media data mapping generation 202 discovers pairs of entities that have a high likelihood of representing the same media entity, referred to as pairs of similar media entities 204. After identifying the pairs of similar media entities 204, they may be used in further processing for consolidating a database of media entities and associated metadata stored to the data store 126. The pairs of similar media entities 204 may be formed within a dataset of media information obtained from a single media source or across datasets of media information obtained from multiple media sources by comparing media source graphs for each of the media sources, e.g., comparing a media entity in the first media source graph 108 with all media entities in the second media source graph 116, . . . , and with all media entities in the nth media source graph 124. Then, comparing a different media entity in the first media source graph 108 with all media entities in the second media source graph 116, . . . , and with all media entities in the nth media source graph 124, until all media entities in each of the media source graphs have been analyzed for other similar media entities.

In this way, pairs of similar media entities 204 are identified and indicated in a mapping that can be used in further processing to further refine the database of media being assembled in the data store 126.

In one approach, pairs of similar media entities 204 are created by taking the media information from a single media source and relationships described by metadata included therein to create a single mappable entity for each media entity of a media source. The mappable entity includes all of the metadata for the media entity, including inter-relationships between metadata for the media entity and other media entities.

To create these mappable entities, for each media entity, the media data mapping generation 202 determines an entity identifier and substantially unique pieces of metadata included in metadata for the media entity. Substantially unique pieces of metadata include any metadata or information about the media entity that can be relied upon to uniquely identify the media entity. In one approach, a substantially unique piece of metadata may be a combination of two or more pieces of metadata for the media entity.

For example, the substantially unique pieces of metadata may include a contributor, a title, a duration, an author, a composer, an international standard recording code (ISRC), a universal product code (UPC), a digital object identifier (DOI), a catalog number, and combinations thereof. In some specific examples, the substantially unique pieces of metadata may include a combination, such as a title and a contributor, a duration and a title, a catalog number and a contributor, a group of contributors and a title, etc.

From the entity identifier and substantially unique pieces of metadata, a plurality of metadata tokens are created for the each media entity. Each metadata token is based on the entity identifier and a different substantially unique piece of metadata for the media entity. For example, a first metadata token may include the entity identifier and a title of the media entity, a second metadata token may include the entity identifier and a duration of the media entity, a third metadata token may include the entity identifier and a director of the media entity, etc.

This metadata token generation is repeated for each media entity, for each media source, thereby providing a massive amount of metadata tokens. These metadata tokens may include similar or the same information, and these duplicates will be discovered during further processing.

After the plurality of metadata tokens are generated, candidates for consolidating information are determined. Whenever two reasonably similar metadata tokens are encountered, they are determined to be candidates for consolidation.

In the consolidation process, the plurality of metadata tokens for a first media entity are compared with metadata tokens for other media entities, within and outside of the media source from which the first media entity is obtained. In response to determining that a particular first metadata token has greater than a threshold similarity to a particular second metadata token (as described in more detail later), a pair of metadata identifiers which share a single piece of metadata represented by the particular first and second metadata tokens is formed (e.g., a pair of similar media entities).

From these pairs of metadata identifiers which share a single piece of metadata, actual pairs of similar media entities may be discovered. Each metadata token for the first media entity is compared against each metadata token for the particular second media entity which has the particular second metadata token. Each metadata token for the first media entity has a certainty score of matching a metadata token for the second media entity and a weighting for the particular type of metadata. All the certainty scores are multiplied by their individual weightings and then combined to give a final score for whether the two media entities are a match. When the final score is greater than a threshold, a match has been discovered, and the two media entities form a pair of similar media entities. This process is described in more detail below.

For each pair of candidate media entities, a set of criteria dependent on each attribute type is used for determining the certainty of a match between two media entities being compared. An intermediate score is produced for each attribute type, which is based on a calculated certainty that the attribute type for each media entity matches, multiplied by a weighting score for the particular attribute type. These intermediate scores are then combined, according to a predetermined algorithm, to produce an overall match score.

The certainty is calculated based on how closely the attributes for each media entity match. For example, for determining a certainty of matching two strings which are identical, the certainty may be 1.0. For determining a certainty of matching a normalized version of the string (e.g., a version which strips out punctuation, common words, etc.) with the full string, the certainty may be 0.95. A complete mismatch between strings has a certainty of −1.0. Upon determining certainty between strings that are not perfectly similar or exact matches, certainty typically falls on a sliding scale (from −1.0 to 1.0 or some other predetermined range) based on one or more string similarity algorithms (such as Jaro-Winkler, Levenshtein, Damerau-Levenshtein, and other similar algorithms).

The weighting is calculated based on how important the particular attribute is compared to all other attributes available for a media entity. Due to the nature and relative importance of different attributes, each attribute may have a positive weighting and/or a negative weighting that are used depending on whether the match is successful or unsuccessful. This is because for some attributes, a successful match of the attribute is a better signal of confidence in a match for the associated media entities than an unsuccessful match. For other attributes, an unsuccessful match is a better indicator of non-confidence in the match for the associated media entities than a successful match.

For example, if two recordings (media entities) have the same duration (an attribute of the media entities), it is not a strong indicator of a correlation between the recordings and does not provide strong confidence in a match between the recordings because many recordings may have the same duration. However, if the recordings have a vastly different duration, it is a strong indicator of non-correlation and non-confidence in the match between the recordings, i.e., the recordings are not the same, because the same recordings would necessarily have the same duration. Therefore, the weighting for a positive match would be a low positive weight, while the weighting for a negative match or mismatch would be a high negative weight. This weighting scheme rewards a positive match less than it punishes a mismatch due to the nature of the attribute (duration).

In another example, if two movies share a DOI, it is a strong indicator of a correlation between the movies and provides strong confidence in a match between the movies because two different movies would not have the same DOI assigned thereto. However, if the movies have a different DOI, it is not a strong indicator of non-correlation and does not result in non-confidence in the match between the movies, i.e., the movies may still be the same entity, because it is common for the same movies to have different DOIs which would lead to mismatches being common. Therefore, the weighting for a positive match would be a high positive weight, while the weighting for a negative match or mismatch would be a low negative weight. This weighting scheme rewards a positive match greater than it punishes a mismatch due to the nature of the attribute (DOI).

In one approach, the results of the various attribute comparisons for two media entities may be simply added together to produce the overall match score.

In another approach, to combine the results of the various attribute comparisons for two media entities to produce the overall match score, an uncertainty reduction algorithm may be used. This uncertainty reduction algorithm uses positive results to tend towards a certainty of 1.0 and negative results to trend away from a certainty of 1.0 toward uncertainty of −1.0, with a threshold being placed somewhere between 0 and 1.0 to indicate a match, such as 0.25, 0.5, 0.75, 0.8, 0.9, etc.

Equation 1 represents the uncertainty reduction algorithm, according to one embodiment, that may be applied for each attribute individually, where $C_O$ is old certainty calculated during a last iteration (which starts at a default value of 0.0), $C_N$ is a new certainty resulting from Equation 1, and AS is an attribute score for the current attribute being compared.

$$C_N = C_O + ((1.0 - C_O) * AS) \quad \text{Equation 1}$$

The nature of the uncertainty reduction algorithm dictates that no specific ordering in which the attributes are analyzed is necessary, as long as no caps are applied at each stage. As long as no positive weight exceeds 1.0, the certainty will never exceed 1.0.

For example, the following example weights for different attribute types may be used with the uncertainty reduction algorithm, with a threshold of certainty to indicate a match set at 0.6. Again, a track is a fixed release of a recording, such as on a single, an album, in a movie, posted online, etc. A release is a product containing a collection of recordings, such as an album, EP, etc. A contributor is a person involved in the creation of a recording, such as an artist, singer, author, composer, director, actor, etc.

Attribute type Recording: 1.0 certainty*0.6 weight=0.6 attribute score

Attribute type Release: 0.6 certainty*0.5 weight=0.3 attribute score

Attribute type Contributor: −1.0 certainty*0.5 weight=−0.5 attribute score

By applying the results of the recording match in the uncertainty reduction algorithm, the new certainty becomes 0.0+((1.0−0.0)*0.6)=0.6. By applying the results of the release match in the uncertainty reduction algorithm, the new certainty becomes 0.6+((1.0−0.6)*0.3)=0.72. By applying the results of the performer match to the uncertainty reduction algorithm, the new certainty becomes 0.72+((1.0−0.72)*−0.5)=0.58. In this example, as a result of the contributor mismatch and lack of certainty of the release match, the certainty (0.58) falls below the threshold (0.6) and would not be considered an automatic match. In one approach, this match may be further reviewed, because it is so close to the threshold.

By utilizing the uncertainty reduction algorithm to determine the certainty of matches between media entities, allows for the impact of a media source which includes media entities but not metadata to not have an unnecessary negative impact on the match score, unlike the appropriate negative impact of two media sources providing mismatched metadata.

Some typical approaches use a "meet one of several criteria for success" approach, which does not provide a full analysis of the impact of mismatched information. The uncertainty reduction algorithm accounts for a situation where even when one attribute is matched, other attributes either need to not be present (which is not possible from some media sources due to lack of metadata), or at least support the original attribute in some way. This avoids false positives that could arise from incorrect identifications (IDs) and other unforeseen media entity and metadata issues.

Unless a single attribute provides 100% certainty that two media entities are the same, a certainty of 1.0 will not be achieved. This reflects the real world, where educated guesses are being made about whether two media entities from different media sources are actually the same thing based on the available information.

Below, some example attributes are discussed along with example weightings. However, more or less attributes may be included in the metadata for any particular media entity as would be understood by one of skill in the art upon reading the present descriptions.

For any particular media entity, metadata associated with the media entity may describe a track for the media entity (such as for music recordings on an album). In one approach, a threshold that indicates a match between track identification between two sets of metadata may be set in a range from about 0.5 to about 0.9, such as 0.7. To determine whether two tracks are the same based on the metadata thereof, certain attributes about the track in the metadata may be more useful than others. In one example, information about the recording, the release, and the contributor may be utilized to determine whether the tracks are the same.

In this example, for determining weighting for a recording match or mismatch between the two media entities, the positive weighting for a match between the recordings may be set in a range from about +0.4 to about +0.8, such as +0.6, while the negative weighting for a mismatch between the recordings may be set in a range from about −0.8 to about −0.4, such as −0.6. Further, several different attributes may be used to determine whether the recordings are a match, including the below-described attributes and those not specifically described herein, but known in the art. In one example, an audio equivalency ID may be compared for the recordings, with the positive weighting for a match between the audio equivalency ID being set at +1.0 (because it is determinative of the same recording), while the negative weighting for a mismatch being set in a range from about −0.4 to about −0.1, such as −0.2. In an example, ISRCs may be compared for the two recordings, with the positive weighting for a match between the ISRCs being set in a range from about +0.6 to about +0.9, such as +0.8, while the negative weighting for a mismatch being set in a range from about −0.3 to about −0.1, such as −0.2. According to one example, names or titles of the two recordings may be compared, with the positive weighting for a match between the names being set in a range from about +0.4 to about +0.8, such as +0.6, while the negative weighting for a mismatch being set in a range from about −0.8 to about −0.4, such as −0.6.

For determining weighting for a release match or mismatch between the two media entities, the positive weighting for a match between releases may be set in a range from about +0.3 to about +0.7, such as +0.5, while the negative weighting for a mismatch may be set in a range from about −0.7 to about −0.3, such as −0.5. Further, several different attributes may be used to determine whether the releases are matched, including the below-described attributes and those not specifically described herein, but known in the art. In one example, a release name or title may be compared for the releases, with the positive weighting for a match between the release names being set in a range from about +0.4 to about +0.8, such as +0.6, while the negative weighting for a mismatch being set in a range from about −0.8 to about −0.4, such as −0.6. In an example, UPCs may be compared for the two releases, with the positive weighting for a match between the UPCs being set in a range from about +0.6 to about +0.9, such as +0.8, while the negative weighting for a mismatch being set in a range from about −0.3 to about −0.1, such as −0.2. According to one example, total duration for the two releases may be compared, with the positive weighting for a match between the durations being set in a range from about +0.1 to about +0.5, such as +0.2, while the negative weighting for a mismatch being set in a range from about −0.7 to about −0.3, such as −0.5.

For determining weighting for a contributor match or mismatch between the two media entities, the positive weighting for a match between contributors may be set in a range from about +0.1 to about +0.5, such as +0.2, while the negative weighting for a mismatch may be set in a range from about −0.7 to about −0.3, such as −0.5.

When a subset of attributes are used to determine a match or mismatch between a specific aspect of two media entities, a smaller set and a larger set may be percentage averaged to provide a subset boost.

For any particular media entity, metadata associated with the media entity may describe a release for the media entity (such as for an album). In one approach, a threshold that indicates a match between release identification between two sets of metadata may be set in a range from about 0.5 to about 0.9, such as 0.7. To determine whether two releases are the same based on the metadata thereof, certain attributes about the releases in the metadata may be more useful than others. In one example, information about the name or title, a track list, and the contributors may be utilized to determine whether the releases are the same. Further, several different attributes may be used to determine whether the releases are a match, including the below-described attributes and those not specifically described herein, but known in the art.

In this example, for determining weighting for a release name or title match or mismatch between two media entities, the positive weighting for a match between the names may be set in a range from about +0.3 to about +0.7, such as +0.5, while the negative weighting for a mismatch between the names may be set in a range from about −0.7 to about −0.3, such as −0.5.

In one example, a track list may be compared for the two media entities, with the positive weighting for a match between the track lists being set in a range from about +0.4 to about +0.8, such as +0.6, while the negative weighting for a mismatch being set in a range from about −0.8 to about −0.4, such as −0.6. In an example, contributors may be compared for the two releases, with the positive weighting for a match between the contributors being set in a range from about +0.1 to about +0.5, such as +0.2, while the negative weighting for a mismatch being set in a range from about −0.7 to about −0.3, such as −0.5.

For any particular media entity, metadata associated with the media entity may describe a contributor for the media entity (such as for a recording, movie, video clip, blog, social media post, etc.). In one approach, a threshold that indicates a match between contributor identification between two sets of metadata may be set in a range from about 0.5 to about 0.9, such as 0.65. To determine whether two contributors are the same based on the metadata thereof, certain attributes about the contributors in the metadata may be more useful than others. In one example, information about the name, writer credits, performer credits, and director credits may be utilized to determine whether the contributors are the same. Further, several different attributes may be used to determine whether the contributors are a match, including the below-described attributes and those not specifically described herein, but known in the art.

In this example, for determining weighting for a contributor name match or mismatch between two media entities, the positive weighting for a match between the names may be set in a range from about +0.3 to about +0.8, such as +0.6, while the negative weighting for a mismatch between the names may be set in a range from about −0.8 to about −0.3, such as −0.6.

In one example, writer credits may be compared for the two media entities, with the positive weighting for a match between the writer credits being set in a range from about +0.2 to about +0.6, such as +0.4, while the negative weighting for a mismatch being set in a range from about −0.6 to about −0.2, such as −0.4. For comparison of writer credits between two media entities, a set of names may be built up from several sources, with list sizes and overlap being compared using an algorithm (such as logarithmic) configured to boost overlap percentage at high values. Moreover, a subset boost may also be applied to determine a match for writer credits.

In an example, performers may be compared for the two media entities, with the positive weighting for a match between the performers being set in a range from about +0.2 to about +0.6, such as +0.4, while the negative weighting for a mismatch being set in a range from about −0.6 to about −0.2, such as −0.4. For comparison of performers between two media entities, a set of names may be built up from several sources, with list sizes and overlap being compared using an algorithm (such as logarithmic) configured to boost overlap percentage at high values. Moreover, a subset boost may also be applied to determine a match for performers.

For any particular media entity, metadata associated with the media entity may describe a work (such as for a recording, movie, video clip, blog, social media post, etc.). In one approach, a threshold that indicates a match between work identification between two sets of metadata may be set in a range from about 0.5 to about 0.9, such as 0.6. To determine whether two works are the same based on the metadata thereof, certain attributes about the works in the metadata may be more useful than others. In one example, information about the name and writer credits may be utilized to determine whether the works are the same. Further, several different attributes may be used to determine whether the works are a match, including the below-described attributes and those not specifically described herein, but known in the art.

In this example, for determining weighting for a name match or mismatch between two media entities, the positive weighting for a match between the names may be set in a range from about +0.3 to about +0.8, such as +0.5, while the negative weighting for a mismatch between the names may be set in a range from about −0.8 to about −0.3, such as −0.5.

In one example, writer credits may be compared for the two media entities, with the positive weighting for a match between the writer credits being set in a range from about +0.2 to about +0.6, such as +0.4, while the negative weighting for a mismatch being set in a range from about −1.0 to about −0.6, such as −1.0. For comparison of writer credits between two media entities, a set of names may be built up from several sources, with list sizes and overlap being compared using an algorithm configured to boost overlap percentage at high values. Moreover, a subset boost may also be applied to determine a match for writer credits.

In one approach, for each pair of similar metadata entities, a full match pair data set is created, which includes all of the information, weighting, and metadata regarding the various attributes that was used to determine that the pair of similar metadata entities were similar (e.g., the attributes which lead to certainty above a threshold that the media entities matched). This information is stored by the media data mapping generation 202 to the data store 126 in the pairs of similar media entities 204.

For each media entity type, a joined set is created for all of the latest results once the pairs of similar media entities 204 are generated for a new batch of data. When more data is obtained from additional media sources, a table is created for each pair of media entities.

Figure 3:
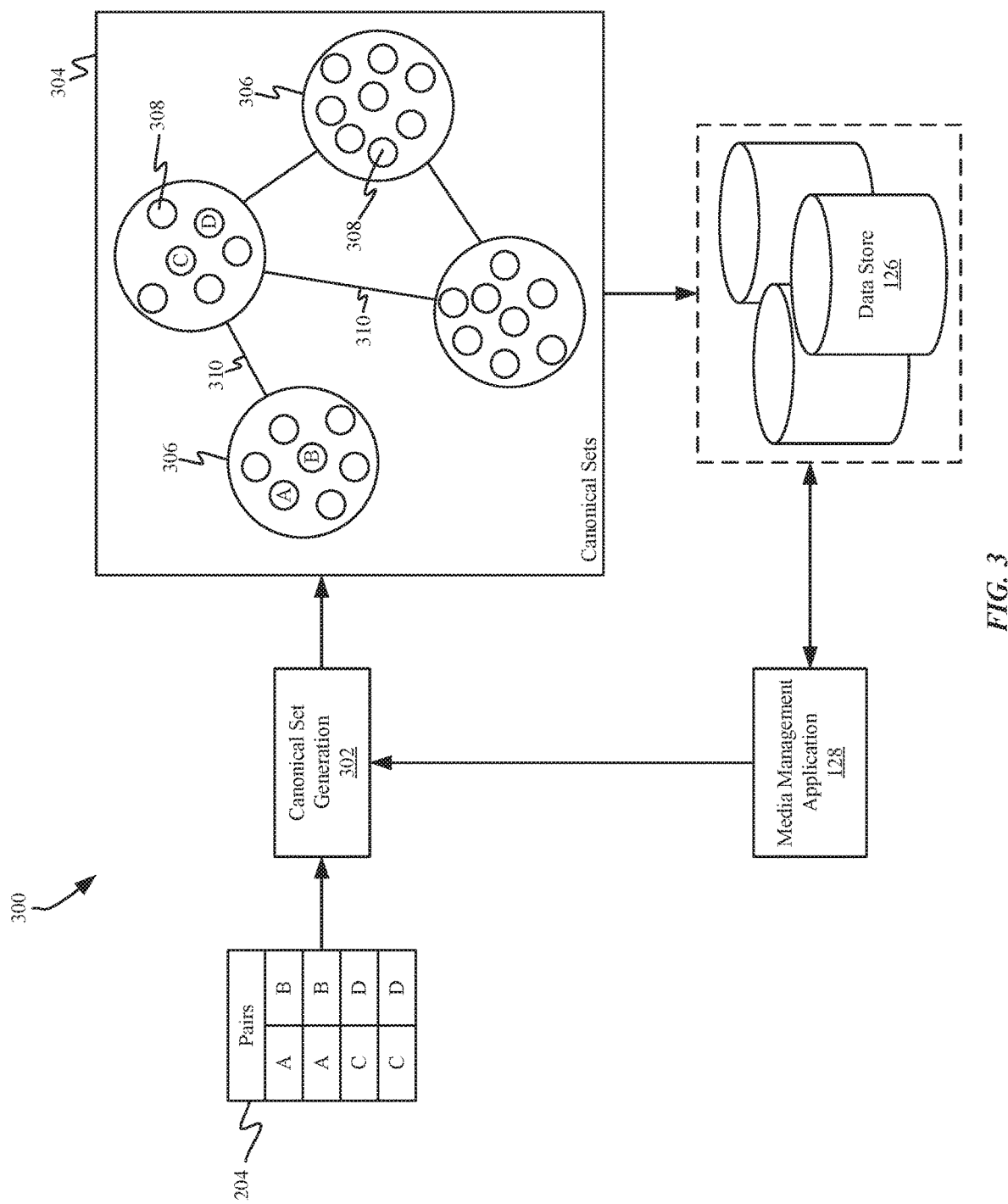
FIG. 3 is a block diagram of an example system for identifying canonical sets.

FIG. 3 is a block diagram of an example system 300 for identifying canonical sets. The system 300 performs canonical set generation 302 to cluster or group together all of the different media entity types identified in the pairs of similar media entities 204 into separate groups 306 in a logical canonical set collection 304.

Different types of media entities benefit from different clustering or grouping in order to enhance the ability to effectively search and analyze the data in the logical canonical set collection 304. In one approach, canonical set generation 302 analyzes the nodes of each graph for each media entity and for each source in generating the canonical sets 306 in the logical canonical set collection 304. The logical canonical set collection 304, which includes all of the relationships 310 between the various canonical sets 306 and individual media entities 308 within the canonical sets 306, is stored to the data store 126 for use in further processing.

To provide more detail about the generation of the logical canonical set collection 304, each step will be described separately. Each of the described steps for generating the canonical sets may be performed by a module or routine performing canonical set generation 302, or partially by some external system and the module or routine performing canonical set generation 302.

In the mapping stage, pairs of similar media entities 204 were created. In order to effectively utilize these pairs, the pairs should be expanded to include all similar media entities that are similar to the pair, referred to as clustering or grouping, which results in canonical sets 306 of media entities 308. One challenge in generation of these canonical sets 306 is transitivity.

To overcome the problem of transitivity, in various approaches, one or more sorting algorithms of a type known in the art may be utilized. To manage the various entities that are created during the canonical set generation, a graph ID for each canonical set is created and assigned thereto. The graph ID may be generated, in one approach, by applying a hashing function on various entity IDs of the media entities 308 within a particular canonical set 306, so that the graph ID will reflect a current membership in the canonical set 306 at any given time, e.g., the graph ID for a canonical set 306 will change as media entities 308 are added or subtracted from the canonical set 306.

According to one approach, a first media entity is grouped in a canonical set with a second media entity in response to determining that more than one piece of substantially unique metadata corresponding to the second media entity has greater than a threshold similarity to substantially unique pieces of metadata corresponding to the first media entity. Substantially unique pieces of metadata include any metadata, attribute, aspect, etc., of a media entity that can be used to uniquely describe the particular media entity, and in some approaches, more than one attribute or aspect may be used in combination to form the substantially unique pieces of metadata.

In one example, the substantially unique pieces of metadata may include any of: a contributor, a performer, an actor, a singer, a title, a duration, an author, a composer, a UPC, an ISRC, a DOI, a catalog number, and combinations thereof.

At this point in the processing, each of the media entities 308 have been normalized to adhere to the global metadata schema of the media management application that is applied across all of the various media entity types (e.g., movies, audio recordings, videos, blogs, social media posts, etc.). Moreover, the global metadata schema includes the capability to store more attributes and aspects as metadata than any single metadata schema for the various media sources.

In an approach, after creation of a canonical set 306, a graph identifier of the first media entity is associated with the second media entity that links the two media entities together in the canonical set 306. This procedure is repeated until all media entities in the pairs of similar media entities 204 are analyzed for similarities and canonical sets 306 have been created and updated having all similar media entities 308 separately identified therein.

Next, after the plurality of canonical sets 306 are generated and after all of the pairs of similar media entities 204 have been analyzed during canonical set generation 302, relationships 310 between particular canonical sets 306 are determined. At this point, the identity (including all pertinent metadata associated therewith) of each media entity 308 within each canonical set 306 is known, along with relationships between the individual media entities 308 based on the metadata thereof and the type of media entity being analyzed. Therefore, set relationships may be inferred based on the media entity relationships.

In response to a relationship existing between two media entities (in two different entity types), there is an indication that canonical sets of the two media entities may also have a relationship, but this is not always true. Therefore, additional analysis is performed after identifying that media entities of two different canonical sets have a relationship.

In one approach, in order to determine whether any two canonical sets 306 have a relationship (indicated by a set relationship 310), which is based on a relationship existing between a threshold amount of media entities 308 within each set, two metrics may be used for the given pair of canonical sets: connectedness and connectedness ratio.

Connectedness is a metric which indicates a number of connections between a pair of canonical sets. Connectedness is a measure of how many member or constituent media entities of a first canonical set are related to member media entities of a second canonical set (i.e., a total count of connections between media entities 308 in different canonical sets 306).

Connectedness ratio is a ratio of the connectedness between a pair of canonical sets compared against a size of a smaller of the two canonical sets in the pair of canonical sets, i.e., connectedness ratio=connectedness/size of smaller canonical set.

Connectedness and connectedness ratio help to determine how strongly two canonical sets are related so that false connections are not formed between canonical sets 306 based on a limited number of connections between media entities in the pair of canonical sets. This methodology helps to minimize noise that could pollute the dataset and reduce the advantages of forming the relationships 310 between canonical sets 306.

For example, if two canonical sets both contain 100 entities, but only one pair of entities are related, this entity relationship should not be copied to the overall canonical sets based solely on this entity relationship. Instead, additional analysis should be performed to determine whether there is a relationship 310 between the canonical sets 306.

The additional analysis may include determining whether the connectedness ratio is above a first threshold that is used to indicate a relationship between sets. In response to the connectedness ratio being above the first threshold, the relationship 310 between the two canonical sets 306 is formed or established. In response to the connectedness ratio being below the first threshold, it is determined whether connectedness is above a second threshold.

In response to the connectedness being above the second threshold, the relationship 310 is established between the two canonical sets 306. Otherwise, in response to the connectedness being below the second threshold, no relationship is established.

Essentially, a relationship 310 between two canonical sets 306 is filtered out (e.g., removed) if both of the following conditions are met: 1) the connectedness ratio is lower than the first threshold, and 2) the connectedness is lower than the second threshold.

In one approach, the first threshold may be set in a range from about 0.1 to about 0.5, such as 0.2. In an approach, the second threshold may be set in a range from 1 to 5, such as 2. The values for which the first and second thresholds are set may be fine tuned over a course of time of operating the system 300, in order to achieve the desired accuracy of set generation and relationship establishment.

Moreover, as more and more canonical sets 306 are generated, there is the possibility that some canonical sets include similar media entities therein. Therefore, a first canonical set having a first global media identifier (GMI, also referred to as a graph identifier) may be combined with a second canonical set having a second GMI in response to determining that more than a threshold number of substantially unique pieces of metadata are shared by metadata corresponding to all media entities in both canonical sets. Moreover, in a situation where the second canonical set has less media entities than the first canonical set, the second GMI and all associations of the second GMI to media entities may be deleted in response to the combining of the canonical sets. This processing helps to combine canonical sets which include the same media entities and to eliminate duplications within the canonical set collection 304.

Figure 4:
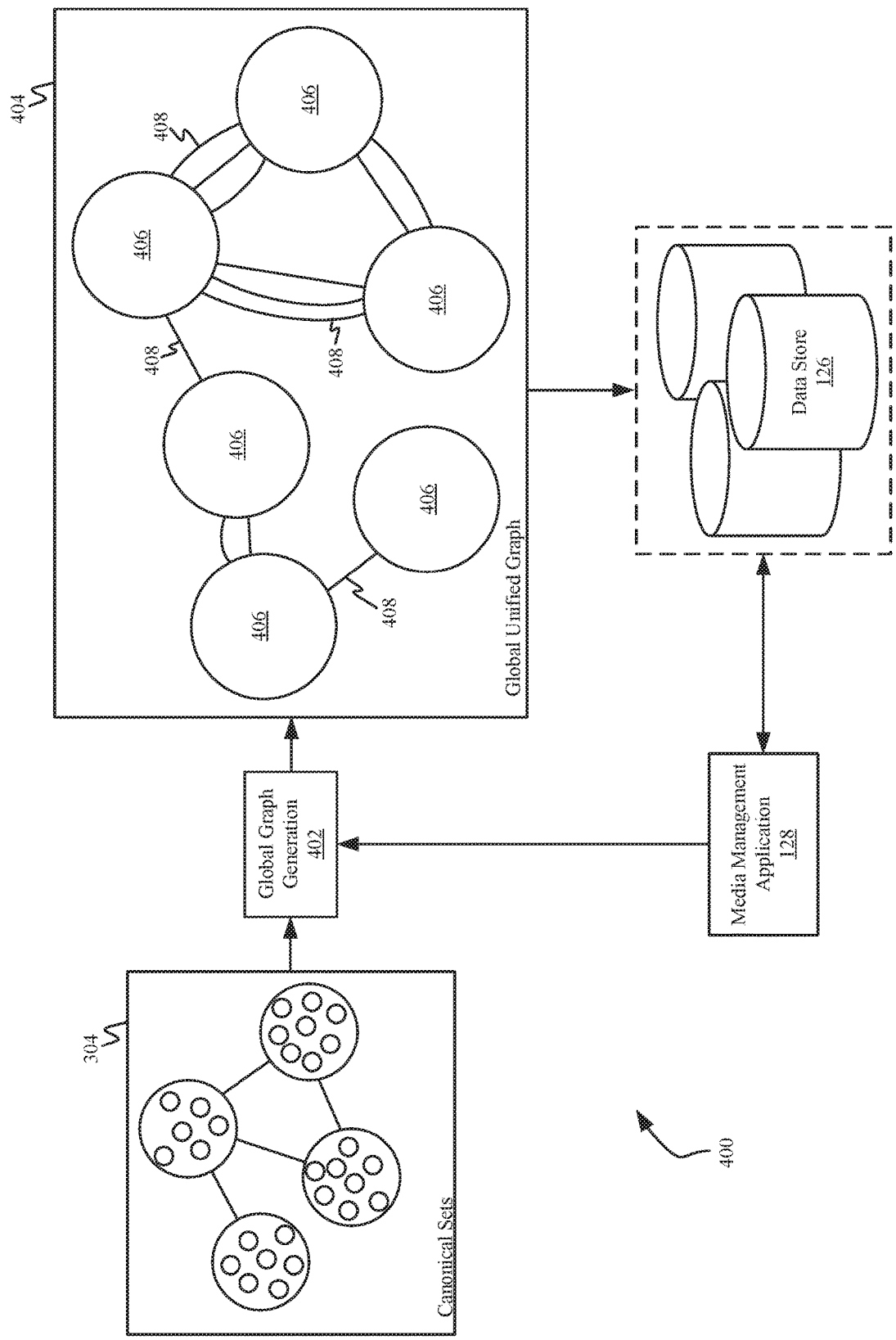
FIG. 4 is a block diagram of an example system for generating a global unified graph.

Now referring to FIG. 4, a block diagram of an example system 400 for generating a global unified graph 404 is shown. As shown, the plurality of canonical sets and relationships therebetween (collectively, the canonical set collection 304) is analyzed in a global graph generation process 402 to determine whether duplicate media entities exist within the canonical set collection 304, thereby reducing the canonical sets into single media entity collections 406 which are indicated using a unique GMI and include references to all media entities that were collected within the particular canonical set. Moreover, additional relationships 408 are identified between media entity groups 406 as a more complete view of each media entity group 406 is revealed by the collection of metadata gathered from each of the similar media entities within the media entity groups 406.

Furthermore, for each media entity, a GMI is assigned thereto, even when no other media entities match a particular media entity. That is, generation of the global unified graph 404 is an iterative process, as each media entity is compared to other media entities based on metadata thereof (either in previous operations such as pairing and canonical set generation), or as the newly obtained media entity is normalized and incorporated into the global unified graph 404, in order to determine duplicate media entities within the global unified graph 404 and eliminate the duplicated information while maintaining any unique information within the system 400.

In addition, in response to distinct media entities not being correctly identified by a particular media source or sources, a first media entity may match or have similarities with less than all media entities within a single media entity group 406 in the global unified graph 404, or several media entity groups 406 may match together but have different GMIs.

The first situation results in a GMI split, where this newly introduced data (the first media entity) identifies a split between media entities within the single media entity group related to a first GMI and other media entities in the single media entity group. Therefore, the single media entity group is split into two media entity groups 406 along the lines of division indicated by the first media entity, with the larger of the resultant media entity groups maintaining the original GMI, and a new GMI being assigned to the new media entity group, or vice versa.

The global unified graph 404 is stored to the data store 126 for use in further processing and curating over time to better represent the data included therein.

Within a media entity group 406, there may be a list or some other representation of all the equivalent/matching media entities included therein. It is likely that these media entities disagree with each other on one or more individual metadata attributes or aspects. Hence, it is useful to utilize an algorithm to determine which of the various metadata values are used to represent all media entities within the media entity group 406.

In one approach, each media source is afforded a number of "votes" which act as weights in the calculation. However, instead of assigning all votes for a single value, a media source is allowed to vote for multiple values. The number of votes on a certain value may be set to be proportional to the number of media entities (obtained from that media source) that provide a particular value, and may be modified further by a confidence parameter, such as popularity or some other determinable parameter known in the art.

For example, a first media source may be afforded 10 votes for attribute A. Suppose that one media entity group has three media entities obtained from the first media source having a value of V1 while two other media entities obtained from the first media source agree on a value of V2. In this case, for attribute A, value V1 will receive six votes and value V2 will receive four votes from the first media source. Other media sources will also provide votes in a similar fashion, and the value which receives the highest percentage of votes will represent the value for attribute A.

In reality, among different media sources, higher quality information may be provided for a particular attribute than another. Therefore, different votes may be assigned for different media sources based on an amount of trust that is afforded to each media source. Essentially, for a media source, weights may be different for different attributes; that is, for a first attribute, different media sources may have different weights. The value score for each discrete value of an attribute will be equal to a sum of votes from different media sources. Equation 2 indicates how the value score, $S_{vj}$, is computed in one approach.

$$S_{vj} = \sum_{i=1}^{n} \frac{N_{ij}}{N_i} \times w_i \qquad \text{Equation 2}$$

In Equation 2, i denotes the ith media source, j denotes the jth value for an attribute, Nij denotes the total number of media entities from a media source i that have the value j (within a particular media entity group having the same GMI), Ni denotes the total number of media entities in the media source i (within the particular media entity group having the same GMI), and wi denotes the weight of media source i for the attribute being analyzed.

After calculation of each value score for a particular attribute, all the values are ranked based on the scores (highest to lowest), and the value with highest score is adopted to represent the attribute for all media entities within the media entity group having the same GMI.

In one approach, each media source may be defaulted to having the same weight for all different attributes, with the capability to modify the weights over time as the system 400 operates.

Figure 5:
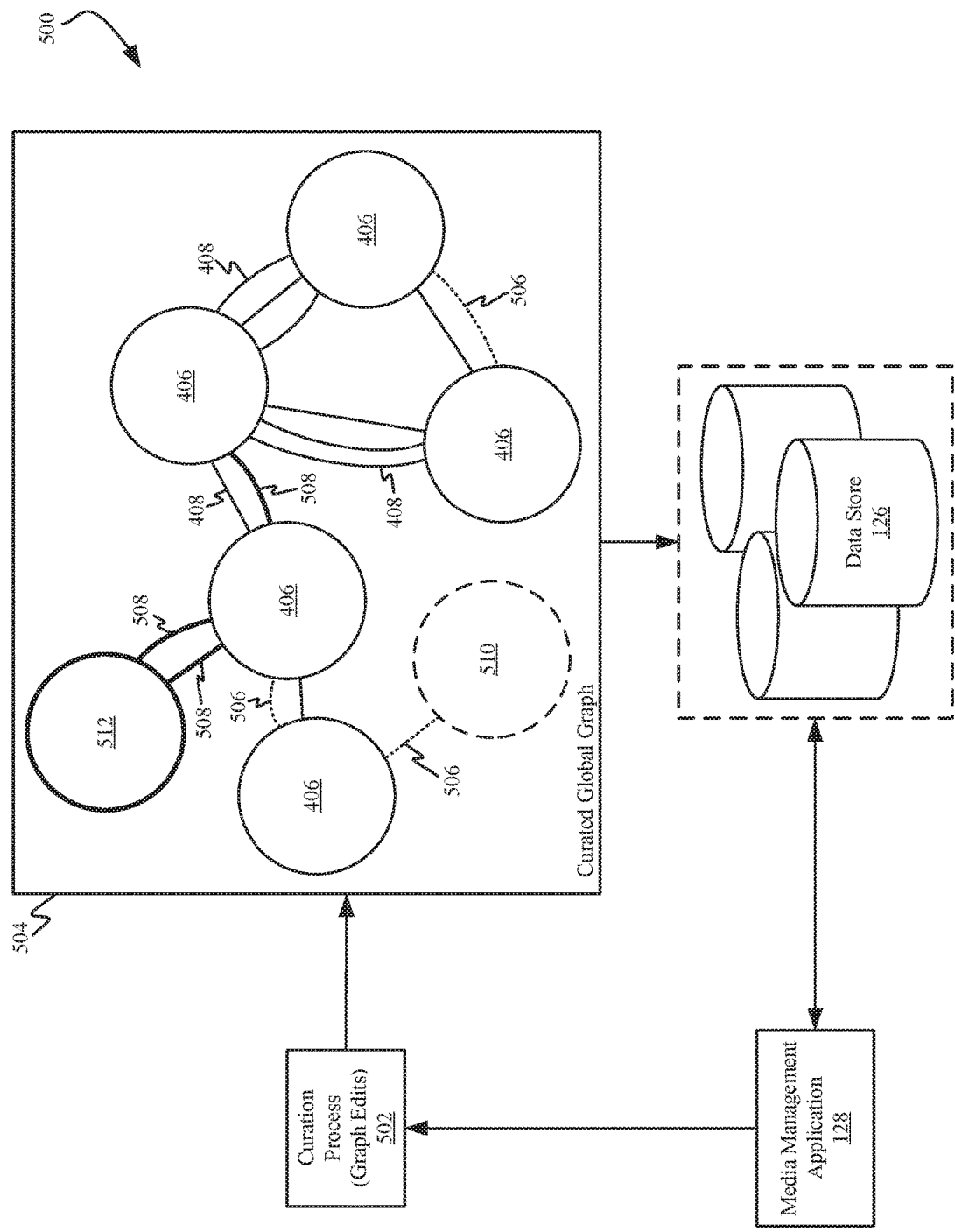
FIG. 5 is a block diagram of an example system for curating the global unified graph.

FIG. 5 is a block diagram of an example system 500 for curating the global unified graph. As shown, the media management application 128, or some other application or system that is authorized and configured for curation, allows a user to perform graph edits 502 on the global unified graph to produce a curated graph 504. In one approach, the curated graph 504 may be stored separately from the global unified graph in the data store 126, and then superimposed or merged together with the global unified graph when data is accessed from the combined graph (having both the curated graph 504 and global unified graph superimposed together).

In one example, the curated graph 504 may be stored as the master version of the global unified graph in the data store 126 and data may be accessed from the curated graph 504.

There are various graph edits that may performed on the global unified graph by a user to produce the curated graph 504. These edits may be made to enhance the accuracy and usability of the global unified graph, based on experience with the global unified graph, feedback on the accuracy of the various media entity groups 406 and connections or relationships 408 therebetween, updates and changes to media entities and metadata thereof, etc.

In one example, a new entity group 512 may be created that includes one or more media entities and associated metadata that would not match any of the other media entity groups 406. According to an example, new connections 508 between media entity groups 406, 512 may be established, based on new information and/or changes to existing information that indicates the new relationship(s) 508. Existing relationship(s) 506 may be removed in the event that there is no nexus between two media entity groups 406 any further, due to changes, updates, or a better understanding of the data set.

Of course, more graph edits 502 are possible other than those specifically described herein, as would be understood by one of skill in the art. Some additional example graph edits include, but are not limited to, addition, removal, or modification of attributes associated with a media entity group 406, modification of a representative value for a particular attribute for a media entity group 406, addition, removal, or modification of media information (media entities and associated metadata) that is used to generate the curated graph 504, etc.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 6:
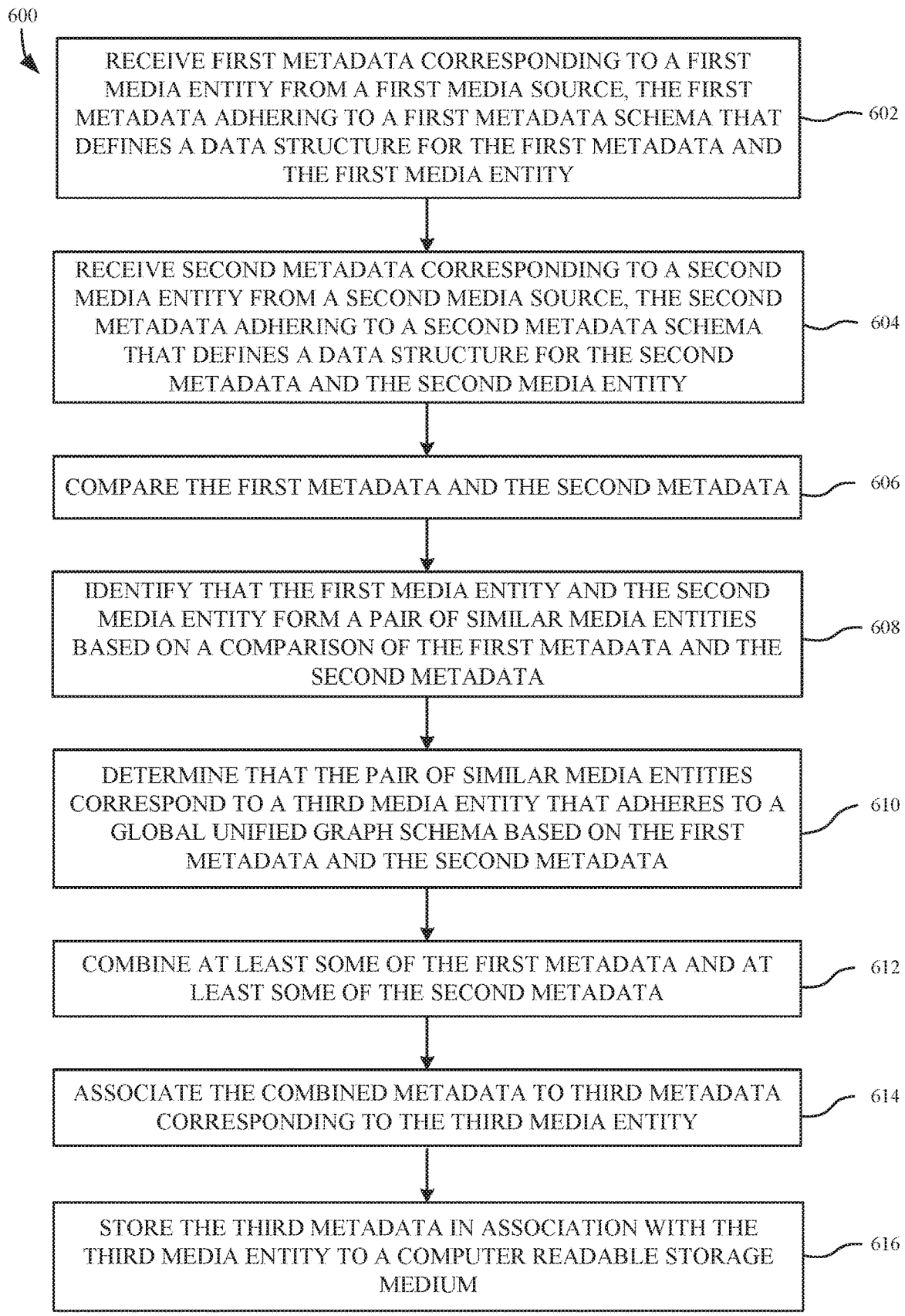
FIG. 6 is flow diagram of an example process for providing a unified pipeline for media metadata convergence.

FIG. 6 is flow diagram of an example process 600 for providing a unified pipeline for media metadata convergence. Method 600 may be performed by a media management application 128 as described in FIG. 1, or some other suitable processor, module, system, or routine configured to execute method 600, as would be known in the art.

Referring again to FIG. 6, in step 602, first metadata corresponding to a first media entity is received from a first media source by a computing device. The first metadata adheres to a first metadata schema that defines a data structure for the first metadata and the first media entity. In some approaches, the first media entity may also be obtained from the first media source.

The computing device typically includes one or more processors and a computer readable storage medium that stores instructions for performing method 600, that when executed by the one or more processors, perform the method.

By obtaining, what is meant is that data is retrieved, received, acquired, transmitted from, or otherwise gathered from the first media source using any suitable communication channel, such as an intranet, internet, wireless network, physical connection, radio frequency (RF), optical signal, etc. In one approach, the first metadata may be requested from the first media source prior to receiving the first metadata.

A media source is any database, system, data store, memory, etc., that is configured to store and maintain media information, such as media entities and/or metadata about media entities. The media source may be accessible a public channel or a proprietary channel specific to the media source.

In step 604, second metadata corresponding to a second media entity is received from a second media source by the computing device. The second metadata adheres to a second metadata schema that defines a data structure for the second metadata and the second media entity.

The first and second metadata schemas may dictate many different characteristics of how and what is stored for the media entities and metadata thereof, such as a format for media entities, which attributes are included in the metadata associated with media entities, a format for the metadata, what type of media entities are included for the media source, and any other pertinent structural information for use in defining the data structure.

In one approach, method 600 may further include receiving a plurality of media entities and corresponding metadata from a plurality of media sources. In this approach, each media source utilizes a different metadata schema for structuring media entities and/or metadata thereof. Moreover, this allows for the combining of many different and possibly non-compatible metadata schemas for more efficient use of the media information stored by the various media sources.

Step 606 includes a comparison of the first metadata and the second metadata in order to determine similarities between the metadata. Any process may be used for the comparison, including those described herein, such as determination of similar pairs of media entities, attribute matching, etc., and others known in the art.

In step 608, the computing device identifies that the first media entity and the second media entity form a pair of similar media entities based on a comparison of the first metadata and the second metadata. This identification is based on a threshold level of similarity between one or more substantially unique pieces of metadata from the first and second metadata.

In one approach, identifying that the first media entity and the second media entity form the pair of similar media entities may include the following operations:

1) Determining a first entity identifier and first substantially unique pieces of metadata included in the first metadata;

2) Determining a second entity identifier and second substantially unique pieces of metadata included in the second metadata;

3) Creating a plurality of first metadata tokens for the first media entity. Each first metadata token is based on the first entity identifier and a different substantially unique piece of first metadata;

4) Creating a plurality of second metadata tokens for the second media entity. Each second metadata token being based on the second entity identifier and a different substantially unique piece of second metadata.

In an approach, the substantially unique pieces of metadata may include any suitable metadata, or combination of metadata that is appropriate for the media entity being described that can reliably differentiate one media entity from another without collisions or confusion. According to several approaches, the substantially unique pieces of metadata may include one or more attributes, such as: a contributor, a title, a duration, an author, a composer, an ISRC, a UPC, a catalog number, and combinations thereof.

According to one implementation, the pair of similar media entities may be identified by comparing the plurality of first metadata tokens with the plurality of second metadata tokens and in response to determining that a particular first metadata token has greater than a threshold similarity to a particular second metadata token, a pair of metadata identifiers which share a single piece of metadata represented by the particular first and second metadata tokens is created to represent the pair.

The threshold may be set at any suitable value that results in a reliable pairing process without excessive false pairs being produced.

For step 610, the computing device determines that the pair of similar media entities correspond to a third media entity that adheres to a global unified graph schema based on the first metadata and the second metadata. The global unified graph schema is different from the first metadata schema and is also different from the second metadata schema. Moreover, the global unified graph schema is used to provide structure for all media entities and metadata that are stored for access by the computing device.

In one approach, the global unified graph schema includes, for metadata thereof, an entity identifier and a plurality of attribute entries. Each attribute entry is configured to store a different attribute of an associated media entity, such as title, contributor, duration, media entity type, etc. The entity identifier is a unique mark (such as a string, code, hash, etc.) that may be used to identify one entity from another within the global unified graph.

In one approach, the global unified graph may be similar to or based on the global unified graph 404, as shown in FIG. 4 and described herein, for providing data structure and organization of the various media entities and metadata included therein.

Referring again to FIG. 6, in step 612, at least some of the first metadata and at least some of the second metadata are combined by the computing device. The portions of the first and second metadata that are chosen to be combined are unique pieces of metadata that compliment one another to more fully describe the underlying media entity.

In step 614, the combined metadata is associated, by the computing device, to third metadata corresponding to the third media entity. This association allows for all of the combined and unique pieces of metadata specific to the third media entity to be used to describe the third media entity, remembering that the third media entity has been determined to be similar to the first and second media entities.

In step 616, the third metadata is stored, in association with the third media entity, to a computer readable storage medium by the computing device. In this way, all of the combined metadata is stored together for the third media entity to more fully describe the third media entity and ease retrieval of metadata for the third media entity.

According to one approach, the third media entity may be grouped with a fourth media entity that adheres to the global unified graph schema. This grouping may be performed in response to determining that more than one piece of substantially unique fourth metadata corresponding to the fourth media entity has greater than a threshold similarity to substantially unique pieces of the third metadata. This procedure may be performed in accordance with the descriptions of FIG. 2.

Moreover, in this approach, a graph identifier of the third media entity is associated with the fourth media entity to form a canonical set comprising the third and fourth media entities. This procedure may be performed in accordance with the descriptions of FIG. 3.

Referring again to FIG. 6, method 600 may include, in an approach, combining a first canonical set having a first graph identifier with a second canonical set having a second graph identifier. This combining may be performed in response to determining that more than a threshold number of substantially unique pieces of metadata are shared by metadata corresponding to all media entities in both canonical sets. In addition, the second canonical set has less media entities than the first canonical set. Thereafter, in an optional process, the second graph identifier and all associations of the second graph identifier to media entities may be deleted in response to the combining. This procedure may be performed in accordance with the descriptions of FIG. 4.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources and providing that data in a unified manner. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Example System Architecture

Figure 7:
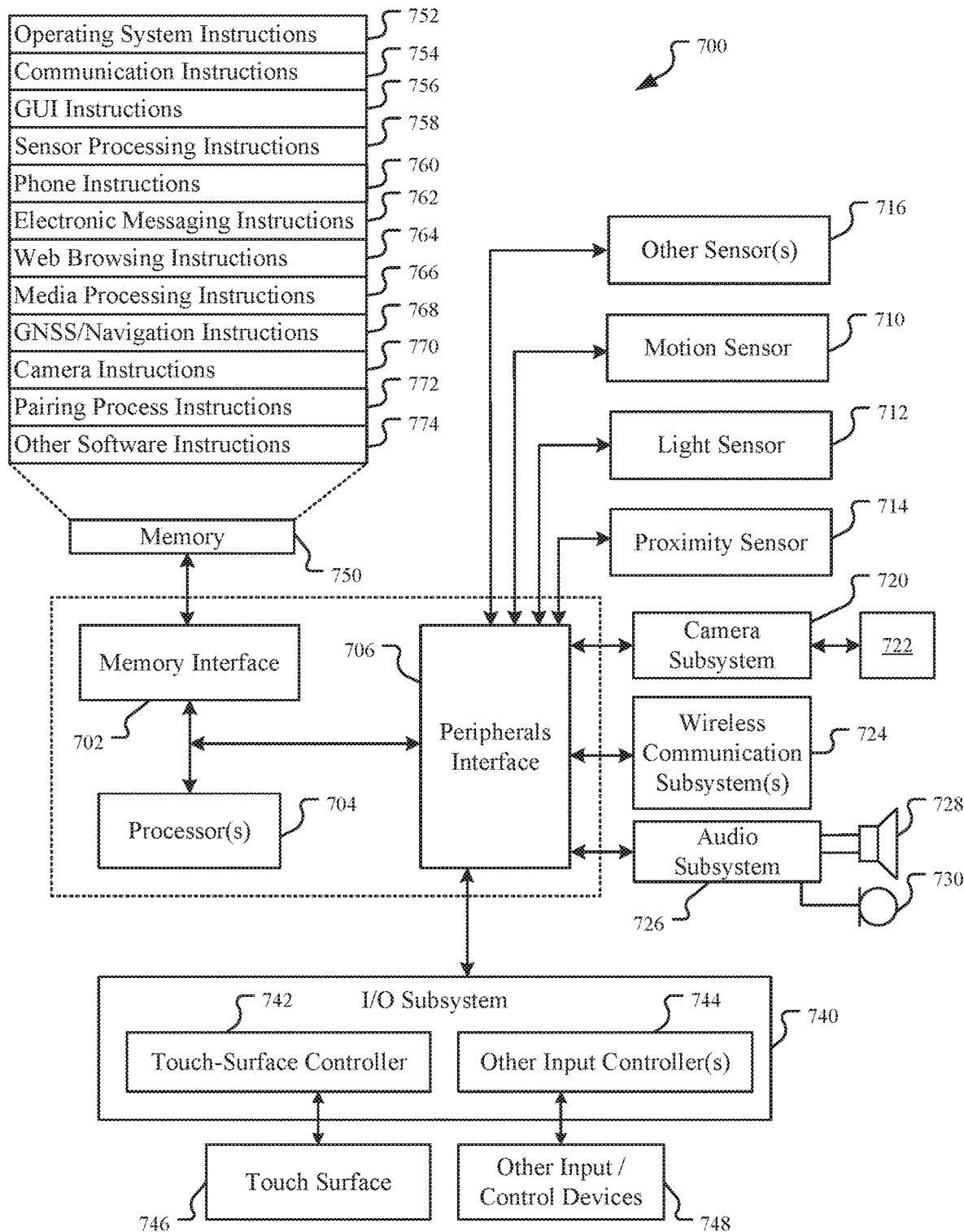
FIG. 7 is a block diagram of an example computing device that may implement the features and processes of FIGS. 1-6.

FIG. 7 is a block diagram of an example computing device 700 that can implement the features and processes of FIGS. 1-6. The computing device 700 can include a memory interface 702, one or more data processors, image processors and/or central processing units 704, and a peripherals interface 706. The memory interface 702, the one or more processors 704 and/or the peripherals interface 706 can be separate components or can be integrated in one or more integrated circuits. The various components in the computing device 700 can be coupled by one or more communication buses or signal lines.

Sensors, devices, and subsystems can be coupled to the peripherals interface 706 to facilitate multiple functionalities. For example, a motion sensor 710, a light sensor 712, and a proximity sensor 714 can be coupled to the peripherals interface 706 to facilitate orientation, lighting, and proximity functions. Other sensors 716 can also be connected to the peripherals interface 706, such as a global navigation satellite system (GNSS) (e.g., GPS receiver), a temperature sensor, a biometric sensor, magnetometer or other sensing device, to facilitate related functionalities.

A camera subsystem 720 and an optical sensor 722, e.g., a charged coupled device (CCD) or a complementary metal-oxide semiconductor (CMOS) optical sensor, can be utilized to facilitate camera functions, such as recording photographs and video clips. The camera subsystem 720 and the optical sensor 722 can be used to collect images of a user to be used during authentication of a user, e.g., by performing facial recognition analysis.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which the computing device 700 is intended to operate. For example, the computing device 700 can include communication subsystems 724 designed to operate over a GSM network, a GPRS network, an EDGE network, a Wi-Fi or WiMax network, and a Bluetooth™ network. In particular, the wireless communication subsystems 724 can include hosting protocols such that the device 100 can be configured as a base station for other wireless devices.

An audio subsystem 726 can be coupled to a speaker 728 and a microphone 730 to facilitate voice-enabled functions, such as speaker recognition, voice replication, digital recording, and telephony functions. The audio subsystem 726 can be configured to facilitate processing voice commands, voiceprinting and voice authentication, for example.

The I/O subsystem 740 can include a touch-surface controller 742 and/or other input controller(s) 744. The touch-surface controller 742 can be coupled to a touch surface 746. The touch surface 746 and touch-surface controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 746.

The other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of the speaker 728 and/or the microphone 730.

In one implementation, a pressing of the button for a first duration can disengage a lock of the touch surface 746; and a pressing of the button for a second duration that is longer than the first duration can turn power to the computing device 700 on or off. Pressing the button for a third duration can activate a voice control, or voice command, module that enables the user to speak commands into the microphone 730 to cause the device to execute the spoken command. The user can customize a functionality of one or more of the buttons. The touch surface 746 can, for example, also be used to implement virtual or soft buttons and/or a keyboard.

In some implementations, the computing device 700 can present recorded audio and/or video files, such as MP3, AAC, and MPEG files. In some implementations, the computing device 700 can include the functionality of a digital audio, video, and/or media player.

The memory interface 702 can be coupled to memory 750. The memory 750 can include high-speed random-access memory and/or non-volatile memory, such as one or more magnetic disk storage devices, one or more optical storage devices, and/or flash memory (e.g., NAND, NOR). The memory 750 can store an operating system 752, such as Darwin, RTXC, LINUX, UNIX, OS X, WINDOWS, or an embedded operating system such as VxWorks.

The operating system 752 can include instructions for handling basic system services and for performing hardware dependent tasks. In some implementations, the operating system 752 can be a kernel (e.g., UNIX kernel). In some implementations, the operating system 752 can include instructions for performing voice authentication. For example, operating system 752 may implement the unified pipeline features as described with reference to FIGS. 1-6.

The memory 750 can also store communication instructions 754 to facilitate communicating with one or more additional devices, one or more computers and/or one or more servers. The memory 750 can include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GNSS/Navigation instructions 768 to facilitate GNSS and navigation-related processes and instructions; and/or camera instructions 770 to facilitate camera-related processes and functions.

The memory 750 can store software instructions 772 to facilitate other processes and functions, such as the unified pipeline processes as described with reference to FIGS. 1-6.

The memory 750 can also store other software instructions 774, such as web video instructions to facilitate web video-related processes and functions; and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 750 can include additional instructions or fewer instructions. Furthermore, various functions of the computing device 700 can be implemented in hardware and/or in software, including in one or more signal processing and/or application specific integrated circuits.

What is claimed is:

1. A method for providing a unified pipeline for media metadata convergence, the method comprising:

receiving, from a first media source by a computing device, first metadata corresponding to a first media entity, the first metadata adhering to a first metadata schema that defines a data structure for the first metadata and the first media entity;

receiving, from a second media source by the computing device, second metadata corresponding to a second media entity, the second metadata adhering to a second metadata schema that defines a data structure for the second metadata and the second media entity;

comparing, by the computing device, the first metadata and the second metadata;

based on a comparison of the first metadata and the second metadata, identifying, by the computing device, that the first media entity and the second media entity form a pair of similar media entities;

determining, by the computing device, whether a first canonical set comprising a first plurality of media entities including the first media entity is related to a second canonical set comprising a second plurality of media entities including the second media entity;

determining, by the computing device, that the pair of similar media entities correspond to a third media entity, that adheres to a global unified graph schema, based on the first metadata and the second metadata, wherein the global unified graph schema is different from the first metadata schema and the second metadata schema and is configured to store all attributes from the first metadata schema and the second metadata schema;

determining, by the computing device, at least some attributes of the first metadata and the second metadata that are unique from third metadata corresponding to the third media entity;

combining, by the computing device, the at least some attributes of the first metadata and the second metadata into combined metadata;

creating, by the computing device, an association between the combined metadata and the third metadata corresponding to the third media entity; and storing, by the computing device, the combined metadata, the third metadata, and the association therebetween to a computer readable storage medium.

2. The method as recited in claim 1, wherein determining whether the first canonical set is related to the second canonical set comprises:

determining, by the computing device, a degree of connectedness between the first and second canonical sets based on a number of first canonical set media entities which are related to second canonical set media entities; and determining, by the computing device, whether the degree of connectedness between the first and second canonical sets exceeds a threshold value.

3. The method as recited in claim 2, further comprising:

combining, by the computing device, the first canonical set with the second canonical set in response to determining that the degree of connectedness between the first and second canonical sets exceeds the threshold value; and deleting, by the computing device, a graph identifier of a smaller of the first or second canonical set and all associations of the graph identifier to media entities in response to the combining.

4. The method as recited in claim 3, wherein the global unified graph schema comprises, for metadata thereof:

an entity identifier; and a plurality of attribute entries, each attribute entry being configured to store a different attribute of an associated media entity, and wherein identifying that the first media entity and the second media entity form the pair of similar media entities comprises:

determining, by the computing device, a first entity identifier and first unique pieces of metadata included in the first metadata;

determining, by the computing device, a second entity identifier and second unique pieces of metadata included in the second metadata;

creating, by the computing device, a plurality of first metadata tokens for the first media entity, each first metadata token being based on the first entity identifier and a different unique piece of first metadata; and creating, by the computing device, a plurality of second metadata tokens for the second media entity, each second metadata token being based on the second entity identifier and a different unique piece of second metadata.

5. The method as recited in claim 4, wherein identifying that the first media entity and the second media entity form the pair of similar media entities comprises:

comparing, by the computing device, the plurality of first metadata tokens with the plurality of second metadata tokens; and in response to determining that a particular first metadata token has greater than a threshold similarity to a particular second metadata token, forming a pair of metadata identifiers which share a single piece of metadata represented by the particular first and second metadata tokens.

6. The method as recited in claim 4, wherein the unique pieces of metadata are selected from a group of attributes comprising: a contributor, a title, a duration, an author, a composer, an international standard recording code (ISRC), a universal product code (UPC), a catalog number, and combinations thereof.

7. The method as recited in claim 1, further comprising:

grouping, by the computing device, the third media entity with a fourth media entity that adheres to the third metadata schema in response to determining that more than one piece of unique fourth metadata corresponding to the fourth media entity has greater than a threshold similarity to unique pieces of the third metadata; and associating, by the computing device, a graph identifier of the third media entity with the fourth media entity to form a canonical set comprising the third and fourth media entities.

8. The method as recited in claim 7, further comprising:

combining, by the computing device, a first canonical set having a first graph identifier with a second canonical set having a second graph identifier in response to determining that more than a threshold number of unique pieces of metadata are shared by metadata corresponding to all media entities in both canonical sets, wherein the second canonical set has less media entities than the first canonical set; and deleting, by the computing device, the second graph identifier and all associations of the second graph identifier to media entities in response to the combining.

9. A non-transitory computer-readable medium including one or more sequences of instructions that, when executed by one or more processors, cause the one or more processors to perform operations comprising:

receiving, from a first media source, first metadata corresponding to a first media entity, the first metadata adhering to a first metadata schema that defines a data structure for the first metadata and the first media entity;

receiving, from a second media source, second metadata corresponding to a second media entity, the second metadata adhering to a second metadata schema that defines a data structure for the second metadata and the second media entity;

comparing the first metadata and the second metadata;

based on a comparison of the first metadata and the second metadata, identifying that the first media entity and the second media entity form a pair of similar media entities;

determining whether a first canonical set comprising a first plurality of media entities including the first media entity is related to a second canonical set comprising a second plurality of media entities including the second media entity;

determining that the pair of similar media entities correspond to a third media entity, that adheres to a global unified graph schema, based on the first metadata and the second metadata, wherein the global unified graph schema is different from the first metadata schema and the second metadata schema and is configured to store all attributes from the first metadata schema and the second metadata schema;

determining at least some attributes of the first metadata and the second metadata that are unique from third metadata corresponding to the third media entity;

combining the at least some attributes of the first metadata and the second metadata into combined metadata;

creating an association between the combined metadata and the third metadata corresponding to the third media entity; and storing the combined metadata, the third metadata, and the association therebetween to a computer readable storage medium.

10. The non-transitory computer-readable medium as recited in claim 9, wherein the operations for determining whether the first canonical set is related to the second canonical set comprise:

determining a degree of connectedness between the first and second canonical sets based on a number of first canonical set media entities which are related to second canonical set media entities; and determining whether the degree of connectedness between the first and second canonical sets exceeds a threshold value.

11. The non-transitory computer-readable medium as recited in claim 10, wherein the operations further comprise:

combining the first canonical set with the second canonical set in response to determining that the degree of connectedness between the first and second canonical sets exceeds the threshold value; and deleting a graph identifier of a smaller of the first or second canonical set and all associations of the graph identifier to media entities in response to the combining.

12. The non-transitory computer-readable medium as recited in claim 11, wherein the global unified graph schema comprises, for metadata thereof:

an entity identifier; and a plurality of attribute entries, each attribute entry being configured to store a different attribute of an associated media entity, and wherein the operations for identifying that the first media entity and the second media entity form the pair of similar media entities further comprise:

determining a first entity identifier and first unique pieces of metadata included in the first metadata;

determining a second entity identifier and second unique pieces of metadata included in the second metadata;

creating a plurality of first metadata tokens for the first media entity, each first metadata token being based on the first entity identifier and a different unique piece of first metadata; and creating a plurality of second metadata tokens for the second media entity, each second metadata token being based on the second entity identifier and a different unique piece of second metadata.

13. The non-transitory computer-readable medium as recited in claim 12, wherein the operations for identifying that the first media entity and the second media entity form the pair of similar media entities further comprise:

comparing the plurality of first metadata tokens with the plurality of second metadata tokens; and in response to determining that a particular first metadata token has greater than a threshold similarity to a particular second metadata token, forming a pair of metadata identifiers which share a single piece of metadata represented by the particular first and second metadata tokens.

14. The non-transitory computer-readable medium as recited in claim 12, wherein the unique pieces of metadata are selected from a group of attributes comprising: a contributor, a title, a duration, an author, a composer, an international standard recording code (ISRC), a universal product code (UPC), a catalog number, and combinations thereof.

15. The non-transitory computer-readable medium as recited in claim 9, wherein the operations further comprise:

grouping the third media entity with a fourth media entity that adheres to the third metadata schema in response to determining that more than one piece of unique fourth metadata corresponding to the fourth media entity has greater than a threshold similarity to unique pieces of the third metadata; and associating a graph identifier of the third media entity with the fourth media entity to form a canonical set comprising the third and fourth media entities.

16. The non-transitory computer-readable medium as recited in claim 15, wherein the operations further comprise:

combining a first canonical set having a first graph identifier with a second canonical set having a second graph identifier in response to determining that more than a threshold number of unique pieces of metadata are shared by metadata corresponding to all media entities in both canonical sets, wherein the second canonical set has less media entities than the first canonical set; and deleting the second graph identifier and all associations of the second graph identifier to media entities in response to the combining.

17. A system comprising:

one or more processors; and a non-transitory computer-readable medium including one or more sequences of instructions that, when executed by the one or more processors, cause the one or more processors to perform operations comprising:

receiving, from a first media source, first metadata corresponding to a first media entity, the first metadata adhering to a first metadata schema that defines a data structure for the first metadata and the first media entity;

receiving, from a second media source, second metadata corresponding to a second media entity, the second metadata adhering to a second metadata schema that defines a data structure for the second metadata and the second media entity;

comparing the first metadata and the second metadata;

based on a comparison of the first metadata and the second metadata, identifying that the first media entity and the second media entity form a pair of similar media entities;

determining whether a first canonical set comprising a first plurality of media entities including the first media entity is related to a second canonical set comprising a second plurality of media entities including the second media entity;

determining that the pair of similar media entities correspond to a third media entity, that adheres to a global unified graph schema, based on the first metadata and the second metadata, wherein the global unified graph schema is different from the first metadata schema and the second metadata schema and is configured to store all attributes from the first metadata schema and the second metadata schema;

determining at least some attributes of the first metadata and the second metadata that are unique from third metadata corresponding to the third media entity;

combining the at least some attributes of the first metadata and the second metadata into combined metadata;

creating an association between the combined metadata and the third metadata corresponding to the third media entity; and storing the combined metadata, the third metadata, and the association therebetween to a computer readable storage medium.

18. The system as recited in claim 17, wherein the operations for determining whether the first canonical set is related to the second canonical set comprise:

determining a degree of connectedness between the first and second canonical sets based on a number of first canonical set media entities which are related to second canonical set media entities; and determining whether the degree of connectedness between the first and second canonical sets exceeds a threshold value.

19. The system as recited in claim 18, wherein the operations further comprise:

combining the first canonical set with the second canonical set in response to determining that the degree of connectedness between the first and second canonical sets exceeds the threshold value; and deleting a graph identifier of a smaller of the first or second canonical set and all associations of the graph identifier to media entities in response to the combining.

20. The system as recited in claim 19, wherein the global unified graph schema comprises, for metadata thereof:

an entity identifier; and a plurality of attribute entries, each attribute entry being configured to store a different attribute of an associated media entity, and wherein the operations for identifying that the first media entity and the second media entity form the pair of similar media entities further comprise:

determining a first entity identifier and first unique pieces of metadata included in the first metadata;

determining a second entity identifier and second unique pieces of metadata included in the second metadata;

creating a plurality of first metadata tokens for the first media entity, each first metadata token being based on the first entity identifier and a different unique piece of first metadata; and creating a plurality of second metadata tokens for the second media entity, each second metadata token being based on the second entity identifier and a different unique piece of second metadata.

21. The system as recited in claim 20, wherein the operations for identifying that the first media entity and the second media entity form the pair of similar media entities further comprise:

comparing the plurality of first metadata tokens with the plurality of second metadata tokens; and in response to determining that a particular first metadata token has greater than a threshold similarity to a particular second metadata token, forming a pair of metadata identifiers which share a single piece of metadata represented by the particular first and second metadata tokens.

22. The system as recited in claim 20, wherein the unique pieces of metadata are selected from a group of attributes comprising: a contributor, a title, a duration, an author, a composer, an international standard recording code (ISRC), a universal product code (UPC), a catalog number, and combinations thereof.

23. The system as recited in claim 17, wherein the operations further comprise:

grouping the third media entity with a fourth media entity that adheres to the third metadata schema in response to determining that more than one piece of unique fourth metadata corresponding to the fourth media entity has greater than a threshold similarity to unique pieces of the third metadata; and associating a graph identifier of the third media entity with the fourth media entity to form a canonical set comprising the third and fourth media entities.

24. The system as recited in claim 23, wherein the operations further comprise:

combining a first canonical set having a first graph identifier with a second canonical set having a second graph identifier in response to determining that more than a threshold number of unique pieces of metadata are shared by metadata corresponding to all media entities in both canonical sets, wherein the second canonical set has less media entities than the first canonical set; and deleting the second graph identifier and all associations of the second graph identifier to media entities in response to the combining.

\* \* \* \* \*